United States Patent [19]

Ivan et al.

[11] Patent Number: 5,325,885
[45] Date of Patent: Jul. 5, 1994

[54] ANTI-SIPHON DEVICE FOR SANITARY APPLIANCE

[75] Inventors: Francescato Ivan, Carouge; Daniel Meylan, Versoix, both of Switzerland

[73] Assignee: Kugler Fonderie et Robinetterie S.A., Geneva, Switzerland

[21] Appl. No.: 6,992

[22] Filed: Jan. 21, 1993

[51] Int. Cl.⁵ ............................................. E03C 1/10
[52] U.S. Cl. ................................. 137/217; 137/512.3; 137/854
[58] Field of Search ...................... 137/217, 218, 512.3, 137/854; 4/678

[56] References Cited

U.S. PATENT DOCUMENTS

| | | | |
|---|---|---|---|
| 1,755,993 | 4/1930 | Kelly et al. | 137/218 |
| 3,633,613 | 1/1972 | Julow | 137/512.3 |
| 4,827,538 | 5/1989 | Heimann et al. | 137/217 X |
| 4,977,920 | 12/1990 | Oberdorfer | 137/218 |
| 5,123,437 | 6/1992 | Egli et al. | 137/218 |
| 5,213,131 | 5/1993 | Gnauert et al. | 137/218 |
| 5,213,268 | 5/1993 | Gnauert et al. | 137/218 |

FOREIGN PATENT DOCUMENTS

| | | |
|---|---|---|
| 0370281 | 1/1992 | European Pat. Off. . |
| 0495372 | 7/1992 | European Pat. Off. . |
| 0499914 | 8/1992 | European Pat. Off. . |
| 3603503 | 8/1987 | Fed. Rep. of Germany . |
| 3805462 | 8/1989 | Fed. Rep. of Germany ...... 137/217 |
| 3934216 | 6/1990 | Fed. Rep. of Germany ...... 137/217 |

Primary Examiner—Gerald A. Michalsky
Attorney, Agent, or Firm—Young & Thompson

[57] ABSTRACT

A backflow preventing device located downstream of a water control member of a sanitary fitting comprises a casing defining a cavity which communicates with a water feeding pipe and with an air inlet. Two shutting members are serially mounted and displaceable under the effect of a depression in the water feeding pipe, thereby connecting the water feeding pipe with the open air through the cavity. The two shutting members are composed of deformable membranes having different characteristics. One membrane is thin, supple and is umbrella-shaped, the other is thick and has the shape of a disc.

10 Claims, 2 Drawing Sheets

ANTI-SIPHON DEVICE FOR SANITARY APPLIANCE

FIELD OF THE INVENTION

The present invention relates to a backflow preventing device for a sanitary fitting, such as a tap, a mixer or a shower mixer.

BACKGROUND OF THE INVENTION

When a sanitary fitting, either a tap, a mixer or a shower mixer for example, feeds a water outlet equipped with a flexible, usually ended with a small shower, one should provide a device which, if the small shower is immersed in the pool full of water and if a depression occurs in one of the water inlet pipe, prevent the water in the pool from being sucked up into the distributing water circuit.

One knows such a backflow preventing device thanks to the document DE-A1-3603503 which comprises, mounted in a chamber connected to the water pipe coming out of the framework, a flexible tube feeding the small shower and to the open air, a shutter which closes normally the exhaust to the open air of this small shower and which connects the water outlet with the flexible tube. This shutter may displace itself against its own weight so that when a depression occurs in the water outlet of the framework, the shutter is released and provokes the communication of this chamber with the open air.

This backflow preventing device presents a major drawback in that the closing strength of the shutter is the gravity. Indeed, this shutter should mandatorily be mounted in such a way that it could displace itself along a vertical axis. Thus, when it is integrated into the body of the sanitary framework, which is generally the case, this framework may no longer be indiscriminately fastened on a horizontal work plane or on a vertical wall. It is then necessary to provide different frameworks according to their purpose.

Furthermore, the depression needed to provoke the opening of the backflow preventing device is not acurately determined because it depends on one hand on the weight of the shutter and also on the other hand on the adjustment of the O-ring joint into a boring. This strength due to the friction of the strength necessary to the displacement of the shutter is undetermined and varies over time due to limestone fouling of the device and also due to the O-ring joint ageing.

One also knows from document EP-A1-0.495,372 a backflow preventing device for sanitary fittings which should also be mounted vertically, both ball-shaped closing members, serially mounted, being able to move themselves under the action of their own weight. Furthermore, this device must mandatorily receive the water delivered by the tap or the mixer axially, this water slipping out normally toward the neck through radial holes giving access to an output channel in the framework. The air intake is also mandatorily axially located under the second ball. This device is complex and is liable to block itself due to limestone fouling and it can only be mounted in a position determined by the gravity action on the balls in the framework.

From the document EP-B1-0.370.281, one knows a backflow preventing device for sanitary framework which also comprises a chamber connected to the water outlet of the framework, to the flexible tube feeding the small shower and to the open air in which moves a shutter allowing the connection to the open air of either the chamber, or the water outlet of the framework. This shutter is composed of a bellowed membrane fastened by its perimeter to the wall of the chamber and displacing itself under the effect of the pressure or the depression coming from the water outlet of the sanitary framework. Moreover, the ageing of the membrane as well as the effect of the limestone deposit modifies its suppleness and thus the strength necessary for its displacement.

Lastly, one knows thanks to the document EP-A2-0.999.914 a backflow preventing device working on the Venturi or water pump principle. This also implies a particular arrangement of the water inlet and outlet which restricts and complicates the production of the sanitary fitting body.

SUMMARY OF THE INVENTION

The object of the present invention is to provide a backflow preventing device for a sanitary fitting, a tap, a mixer or a shower mixer which comprises a chamber mounted in the water output pipe of the sanitary fitting, this chamber being also connected to the open air and containing a shutting member, which prevents under normal operation the connection of the chamber with the open air and also closes the water output pipe of the framework in case of a depression created by this one.

The aim of the invention is the realization of such a device which obviates the above-mentioned drawbacks, i.e. which is independent of the assembly position of the framework, which may be easily replaced in case of failure and which is not subject to ageing, nor to fouling. Moreover, this device should be sensitive to a very low depression in the water distribution pipe while being able to resist to high overpressure, which may occur in that pipe. Lastly, the device should not be located in the water flow delivered by the framework or at least should not be crossed even partially by it.

The object of the present invention is to provide a backflow preventing device for sanitary fitting according to the following description and as defined in claim 1.

DETAILED DESCRIPTION OF THE INVENTION

Figure 1:
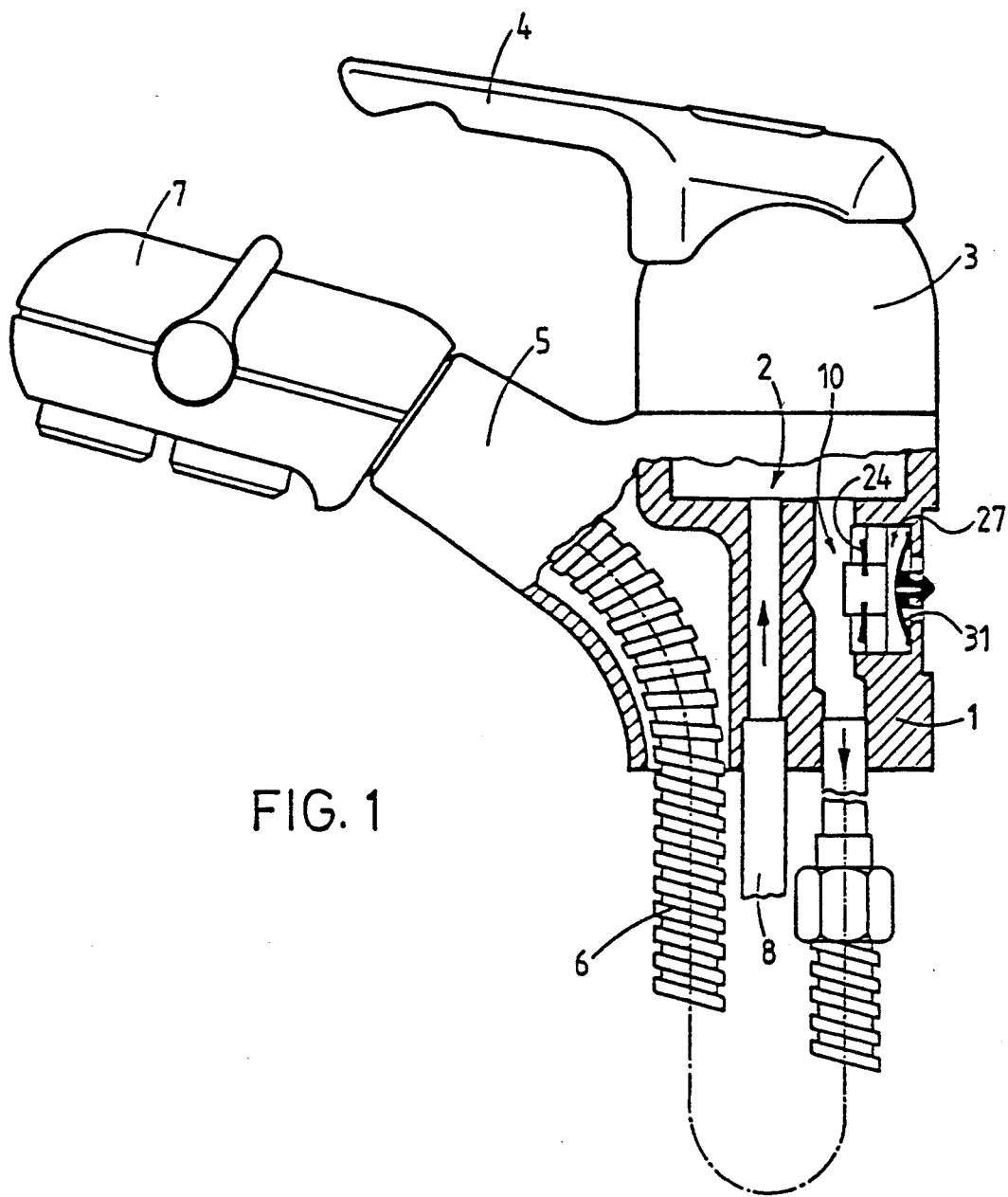
FIG. 1 shows schematically and partially in section a sanitary framework equipped with the backflow preventing device according to the invention.
Figure 2:
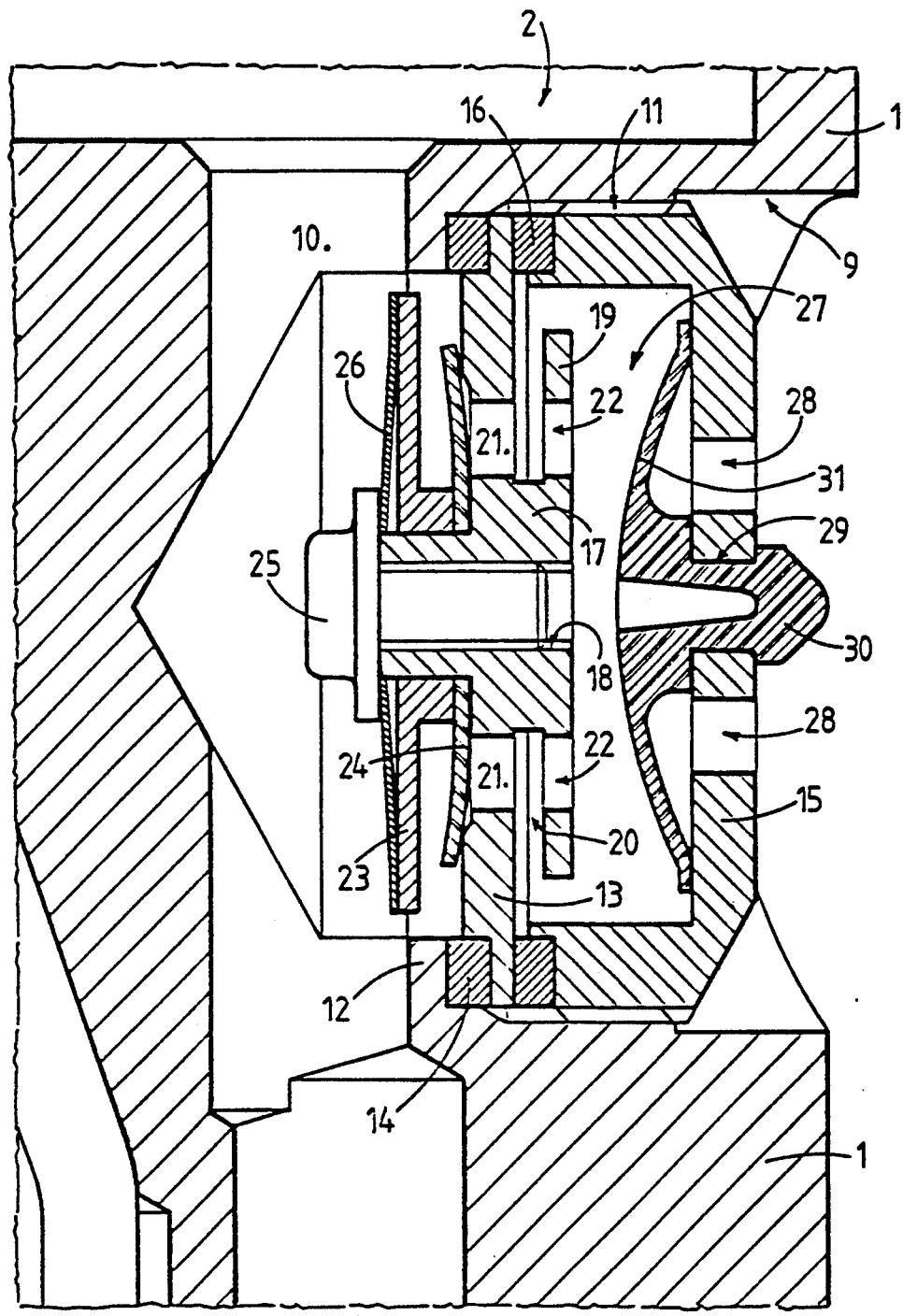
FIG. 2 is a detail in a cross section view at a larger scale showing one embodiment of the backflow preventing device.

FIG. 1 shows a sanitary framework, tap, mixer or shower mixer for example comprising a body 1 intended to be fastened on a working plane. This body 1 comprises a housing 2 which receives a stopping or a mixing mechanism, having a dome 3, operated by a control member 4. This body 1 further comprises a neck 5 giving access to a flexible tube 6 which free end comprises a small shower 7, embedded in a removable way in the end of the neck 5. This body still comprises one or two water inlet 8. The backflow preventing device is made up of an entity of two shutting members serially mounted in a pipe or passage 9 connecting the water outlet pipe 10 of the body 1 of the sanitary framework to the open air. In the illustrated example, this passage 9 is composed of a lateral opening of the body 1 having a circular or cylindrical shape in which is assembled the entity comprising the serially mounted shutting members. This lateral opening 9 comprises a threading 11 and internal edge 12 acting as an abutment for the fastening of the entity comprising the shutting members.

The backflow preventing device mounted in the passage 9 comprises a disc 13 applied against the edge 12 of the passage 9 thanks to a joint 14. This disc 13 is supported in a service position by a nut 15 screwed in the threading 11 of the passage 9 and abutting thanks to a joint 16 against the periphery of the disc 13.

The disc 13 comprises a hub 17 overflowing on both sides of the disc having a central threading 18. The extremity of the hub facing the outside of the body 1 is made up of a ring 19 separated from the disc 13 by a circular groove 20.

Both the disc 13 and the ring 19 are provided with one or more boring 21,22 respectively.

The part of the hub 17 directed toward the water outlet pipe 10 acts as a support for a cross-brace 23 which smaller diameter part allows to apply the central part of a circular membrane 24 against a shoulder of the hub 13. This cross-brace 23 is maintained in its position thanks to a screw 25 screwed in the threading 18 and secured against the inner face of the hub tensioning a spring washer 26. Thanks to this arrangement one can, from a manufacturing point of view, define the pinching strength of the central part of the membrane 24 and thus give it a pre-constraint which tends to move its peripheral part toward the pipe 10 so that in a resting position, the tap being closed, this membrane barely provides watertightness between its peripheral part and the disc 13. A tiny depression in the pipe 10 frees the passages 21. On the other hand, the thickness of the membrane 24 is relatively important 2 to 5 tenth of milimeters so that it is capable of supporting high pressures.

Thus under operating condition, this membrane insures the watertight closing of the passages 21 and supports pressures at least up to $13.10^5$ pascal. On the other hand, when there is no pressure in the pipe 10 or a very tiny depression, lower than 10 mm of water column, the passages 21 let the pipe 10 communicate with the chamber 27, located between the nut 15 and the disc 13.

The assembly and the gauging of the pinching strength of the membrane 24 is made easier thanks to the screw 25 abutting against the hub 17 and the intrinsic characteristics of the spring washer 26.

The terminal face of the hollow nut 15 is pierced with holes 28 allowing the connection of the chamber 27 with the open air outside of the sanitary framework body 1.

This terminal face of the nut 15 still comprises a central boring 29 in which is fastened the central pin 30 of a thin umbrella-shaped membrane 31. This membrane 31 is thus rigidly fixed thanks to its pin's own elasticity on the nut and the central hole thereof watertightly closed.

The umbrella shaped membrane is very supple. It is normally applied by its circular edge against the terminal face of the nut 15 closing that way the holes 28.

This backflow preventing device presents many advantages which mainly are:

1. The device itself is not located in the water outlet pipe 10 strictly speaking, it only needs to be connected to it via a pipe or a channel.

2. Under normal conditions, i.e. without depression in the pipe 10, the umbrella-shaped membrane 31 insures a watertight closing of the holes 28 connected to the open air.

3. As soon as a tiny depression occurs in the pipe 10, depresion in the range of 3 to 10 mmH$_2$O only, this pipe 10 is connected to the open air. Indeed, the membrane 24 is not watertightly applied on its seat and the membrane 31 is very supple and thus able to be distorted by a low pressure. The distortion of the umbrella-shaped membrane 31 may not close the holes 21 because it abuts against the ring 19.

4. When a normal depression occurs in the pipe 10, the membrane 24 is applied against the disc 13 and closes the openings 21 making the pipe watertight and avoiding this way any water intrusion in the chamber 27.

5. In the case of a significant overpressure, ram shot for example, in the pipe 10 the thick membrane 24 supports the shock, up to a pressure higher than 15 bars, which isolates the chamber 27 and thus protects the membrane 31 against any overload.

6. The device may be mounted either directly into the sanitary framework body 1, or into an other casing connected to the water outlet pipe 10.

7. The device is simple, easy to assemble and may be easily replaced.

8. The device not being located in the flow of water, it may this way not be damaged by solid bodies, debris, dirty fragments or the like which may be dragged along by this flow of water.

9. The device may be mounted in any position because its functioning is independant of gravity.

As one sees, this simple device, robust, easily assembled allows a connection of the water outlet pipe with the open air even in presence of a very low depression and on the other hand may resist to the strongest overpressures.

We claim:

1. A backflow preventing device located downstream of a water control member of a sanitary fitting comprising a casing defining a cavity which communicates with a water feeding pipe and with an air inlet, as well as with two shutting members, serially mounted and displaceable under the effect of a depression in the water feeding pipe, thereby connecting the water feeding pipe with the open air through said cavity, said casing having an outer wall provided with passes establishing a communication between the inside of the casing and ambient air; a first umbrella-shaped membrane fixed to said outer wall by a central pin and resting against the inner side of said outer wall through its periphery, whereby in a rest state, the passage are closed; said casing further having an inner wall provided with bores establishing a communication between the inside of said casing and the water feeding pipe; a second thick membrane forced against the outer side of said inner wall through its central portion by resilient means having an adjustable force, whereby in a rest position, a peripheral portion of said second membrane closes said bores; a member fastened with, but spaced apart from, the inner wall of said casing and located inside said casing, said member having openings which provide communication between the passages of the outer wall and the bores of the inner wall when said first and second membranes are resiliently displaced by a depression in the water feeding pipe, said membrane limiting the extent of axial deformation of said first membrane to avoid any damage to said first membrane.

2. Device according to claim 1, wherein it is integrated in the body of a sanitary framework.

3. Device according to claim 2, wherein the casing comprises a disc watertightly applied against the edge of an opening of the casing of the sanitary fitting, giving access to a water outlet pipe and a hollow nut screwed in the casing of the sanitary framework and maintaining the disc in a service position.

4. Device according to claim 3, wherein the nut has a terminal face which includes passages and a central hole, said first umbrella-shaped membrane being fastened to said nut by said central pin engaged by force in said central hole, whereby in a rest state, said first membrane applied by its peripheral edge against the terminal face of the nut closes the passages of the terminal face of the nut.

5. Device according to claim 4, wherein the umbrella-shaped membrane is thin and supple and distorts under a depression in the range of 3 to 10 mm $H_2O$ to open the passages in the terminal face of the nut.

6. Device according to claim 5, wherein the second membrane is fastened on a hub of the disc by pinching of its central zone by a predetermined strength defining a preconstraint of the membrane tending to move apart its peripheral part from the disc.

7. Device according to claim 6, wherein the pinching strength is determined by a spring washer operatively associated with said second membrane.

8. Device according to claim 6, wherein the second membrane is located outside of the cavity of the device and supports pressure of at least 5 bars.

9. Device according to claim 1, wherein the casing is made up of two watertightly connected parts defining between them said cavity.

10. Device according to claim 1, wherein the first umbrella-shaped membrane is located inside the cavity.

* * * * *

UNITED STATES PATENT AND TRADEMARK OFFICE
CERTIFICATE OF CORRECTION

PATENT NO. :   5,325,885
DATED      :   July 5, 1994
INVENTOR(S):   Ivan FRANCESCATO et al.

It is certified that error appears in the above—identified patent and that said Letters Patent is hereby corrected as shown below:

On the title page:

Item [19], change the inventor's surname from "Ivan" to --Francescato--.

In Item [75], change the first inventor's name from "Francescato Ivan" to --Ivan Francescato--.

Signed and Sealed this

Eighteenth Day of October, 1994

Attest:

BRUCE LEHMAN

Attesting Officer    Commissioner of Patents and Trademarks